(12) United States Patent
Wiley (10) Patent No.: US 10,115,955 B1
(45) Date of Patent: Oct. 30, 2018

(54) BATTERY TERMINAL ADAPTER (71) Applicant: Lawrence Brian Wiley, Stuart, FL (US)

(72) Inventor: Lawrence Brian Wiley, Stuart, FL (US)

(*) Notice: Subject to any disclaimer, the term of this patent is extended or adjusted under 35 U.S.C. 154(b) by 418 days.

(21) Appl. No.: 14/681,240

(22) Filed: Apr. 8, 2015

Related U.S. Application Data (60) Provisional application No. 61/977,143, filed on Apr. 9, 2014.

(51) Int. Cl.
H01M 2/30 (2006.01)
B60L 11/18 (2006.01)
H01M 2/20 (2006.01)
H01R 9/24 (2006.01)

(52) U.S. Cl.
CPC ........... *H01M 2/30* (2013.01); *B60L 11/1851* (2013.01); *H01M 2/206* (2013.01); *H01R 9/2416* (2013.01)

(58) Field of Classification Search
CPC ..... H01M 2/206; H01M 2/30; B60L 11/1851; H01R 9/2416
USPC ........................................................ 429/121
See application file for complete search history.

(56) References Cited

U.S. PATENT DOCUMENTS

| 5,171,169 | A | 12/1992 | Butcher et al. |
| 5,597,331 | A | 1/1997 | Gable et al. |
| 5,599,210 | A | 2/1997 | Green |
| 6,162,098 | A | 12/2000 | Cheng et al. |
| 6,165,020 | A | 12/2000 | Cheng et al. |
| 6,234,849 | B1 * | 5/2001 | Blanche .................. H01R 4/42 439/756 |
| 6,334,797 | B1 | 1/2002 | Liang |
| 6,347,958 | B1 | 2/2002 | Tsai |
| 6,375,519 | B1 | 4/2002 | Liang |
| 6,494,752 | B1 | 12/2002 | Liang |
| 6,793,534 | B2 | 9/2004 | Cheng et al. |

* cited by examiner

Primary Examiner — Jonathan G Leong
Assistant Examiner — James M Erwin
(74) Attorney, Agent, or Firm — H. John Rizvi; Gold & Rizvi, P.A.

(57) ABSTRACT

A battery terminal adapter providing support for a plurality of wires, allowing several wires to be connected simultaneously and in parallel to a single battery electrode or terminal, such as the positive or negative electrode of a vehicle battery. For this purpose, the battery terminal adapter includes an adapter body having clamping arms arranged around a battery terminal receiving cavity in which the battery terminal is to be inserted. Wire-receiving holes are provided on both ends of the arms, i.e. on the free end of the arms and on the end opposing the free end. The holes are in electrical communication with the battery terminal receiving cavity so that all electrical wires connected to the wire-receiving holes are powered by the battery. Clean and safe connection of a plurality of electrical wires is achieved by having the wire-receiving holes arranged on opposite sides of the arms.

19 Claims, 6 Drawing Sheets

BATTERY TERMINAL ADAPTER

CROSS-REFERENCE TO RELATED APPLICATION

This application claims the benefit of co-pending U.S. Provisional Patent Application Ser. No. 61/977,143, filed Apr. 9, 2014, which is incorporated herein in its entirety.

FIELD OF THE INVENTION

The present invention relates generally to a battery terminal adapter, and in particular, to a battery terminal adapter that enhances the operational capacity of a battery by providing a mechanical and electrical interface for connecting several electrical cables to a single battery terminal.

BACKGROUND OF THE INVENTION

It is known in the art that a battery is a device for storing chemical energy and converting that chemical energy into electricity. The battery generally includes one or more electrochemical cells, each of which consists of two half-cells or electrodes. One half-cell, called the negative electrode, has an overabundance of the tiny, negatively charged subatomic particles called electrons. The other, called the positive electrode, has a deficit of electrons. When the two halves are connected by a wire or an electrical cable, electrons will flow from the negative electrode to the positive electrode.

Many kinds of batteries are known in the market, depending on multiple design factors such as the output voltage, the output current, the chemical components comprised in the battery, and other diverse factors. For instance, an automotive battery is a type of rechargeable battery that supplies about 12 volts of electrical energy to an automobile vehicle. Automotive batteries are made up of one or more electrochemical cells, each having the capacity to convert chemical energy into a more readily usable form of electrical energy. Automotive batteries are widely employed in many industries and vehicles, including starting, lighting, and ignition (SLI) batteries capable of starting the internal combustion engines of various vehicles, such as cars, trucks, motorcycles, and boats.

Generally, automotive batteries and other batteries are provided with external positive and negative terminals to which the automobile electrical system is connected in order to receive electrical power from the battery. Normally, battery terminals are prepared for coupling a single electrical wire or connector. The vehicle or electrical device feeding from the battery can include one or more electrical outlets to which additional electrical devices can connect ad through which the additional electrical devices can indirectly receive electrical power from the battery.

However, conventional methods and devices for powering new portable electrical devices into an automobile can overwhelm the terminal connections on a typical automobile battery. For example, there are physical limitations for a motorcycle, snowmobile, all-terrain vehicle, or off-road vehicle to plug in a cell phone. With a factory installed cigarette lighter socket, one appliance can be plugged in, but with multiple devices access to the battery may be restricted. Additionally, there are instances when a multiplicity of external electrical devices requires a connection to a same automotive battery. A conventional automotive battery terminal does not normally have the capacity to provide a direct electrical interface to more than one device or electrical system.

In addition, battery compartments (i.e., compartment on a boat, or hood compartment of a vehicle) often limit access and ability to connect multiple electronic devices to a battery. Thus, one must often remove a battery from the compartment to an open space in order to manipulate the electrical connections to the battery terminals.

What is desired is a battery terminal adapter that forms an electrically conductive and mechanically robust connection between a battery terminal and more than one electrical cable, and that is convenient to manipulate in the event of the battery being installed in a reduced space.

SUMMARY OF THE INVENTION

The present invention overcomes the deficiencies of the known art and the problems that remain unsolved by providing a battery terminal adapter that forms connections between multiple electrical components and a single a vehicle battery terminal or electrode, providing an independent and convenient connection for each electrical component wire so that the electrical connections can be manipulated with ease, not requiring removal of the battery from its installation compartment. For this purpose, the battery terminal adapter comprises an adapter body having resilient arms arranged around a battery terminal receiving cavity. The arms are resiliently deformable and configured to clamp a battery terminal that is inserted in the battery terminal receiving cavity. The body further comprises wire-receiving holes on opposite ends of the arms. The wire-receiving holes are in electrical communication with the battery terminal receiving cavity so that all electrical wires connected to the wire-receiving holes are powered by the battery. Clean and safe connection of a plurality of electrical wires is achieved by having the wire-receiving holes arranged on opposite sides of the arms.

In accordance with a first embodiment of the invention, the present invention consists of a battery terminal adapter comprising:

a body side portion having a first end and a second end, the body side portion defining at least one wire-receiving hole therein;

a resiliently deformable first arm extending from and electrically conductive with the first end of the side portion, the first arm having a central portion adjacent to the side portion and an end portion opposite from the side portion;

a resiliently deformable second arm extending from and electrically conductive with the second end of the side portion opposing the first arm, the second arm having a central portion adjacent to the side portion and an end portion opposite from the side portion; and a battery terminal receiving cavity defined by and delimited between the central portions of the first and the second arms; wherein at least one of the end portions of the first arm and the second arm defines at least one wire-receiving hole therein.

In a second aspect, the end portion of the arms is wider than the central portion of the arms.

In another aspect, the wire-receiving holes comprised in the end portions of the arms are arranged transversely, the wire-receiving holes terminating in openings arranged on oppositely-facing respective side surfaces of the arm end portions.

In another aspect, the central portion of each arm comprises a transverse through hole, the transverse through holes of the arms being aligned allowing the insertion of a fastener for causing slight deformation of the arms and securing one arm to another.

In another aspect, the wire-receiving holes comprised in the side portion are arranged on a terminal side surface of the side portion, the terminal side surface being arranged opposite to the battery terminal receiving cavity.

In another aspect, the battery terminal adapter comprises a fastener bore corresponding to each wire-receiving hole, the fastener bore being arranged perpendicular to the corresponding wire-receiving hole and in internal physical communication with the corresponding wire-receiving hole.

In another aspect, the side portion comprises opposite transversely protruding end portions comprising at least one wire-receiving hole.

In another aspect, the battery terminal is entirely metallic and electrically conductive.

In another aspect, the battery terminal is partially metallic, a conductive connection being provided between the battery terminal receiving cavity and all wire-receiving holes.

In another aspect, the body comprises a protruding neck portion providing an internal space in continuation of the battery terminal receiving cavity, for incrementing the effective length of the battery terminal receiving cavity.

In another aspect, the end portion of each arm comprises a single wire-receiving hole, and the body side portion comprises one or more wire-receiving holes, wherein the wire-receiving holes arranged at the end portion of the arms have a greater cross-section than the wire-receiving hole or holes comprised in the body side portion.

In accordance with another embodiment of the invention, the present invention consists of a battery terminal adapter comprising:

a body side portion having a first end and a second end, the body side portion defining at least one wire-receiving hole therein;

a resiliently deformable L-shaped first arm extending from the first end of the body side portion, the first arm comprising a central portion adjacent to the body side portion and an end portion opposite from the body side portion;

a resiliently deformable L-shaped second arm extending from the second end of the body side portion facing the first arm, the second arm comprising a central portion adjacent to the body side portion and an end portion opposite from the body side portion, the second arm in combination with the first arm defining a gap therebetween; and a battery terminal receiving cavity defined by and delimited between the central portions of the first and the second arms; wherein the arm end portions define at least one wire-receiving hole therein and in electrical communication with the battery terminal receiving cavity, the at least one wire-receiving hole being oriented transversely to the longitudinal direction.

In a second aspect, the wire-receiving holes comprised in the end portions of the arms terminate in openings arranged on oppositely-facing respective side surfaces of the arm end portions.

In another aspect, the central portion of each arm comprises a transverse through hole, the transverse through holes of the arms being aligned allowing the insertion of a fastener for causing slight deformation of the arms and securing one arm to another.

In another aspect, the side portion comprises opposite transversely protruding end portions comprising at least one wire-receiving hole.

In another aspect, the end portion of each arm comprises a single wire-receiving hole, and the body side portion comprises one or more wire-receiving holes, wherein the wire-receiving holes arranged at the end portion of the arms have a greater cross-section than the wire-receiving hole or holes comprised in the body side portion.

In accordance with yet another embodiment of the invention, the present invention consists of a battery terminal adapter comprising:

a body side portion having a first end and a second end, the body side portion defining a plurality of wire-receiving holes therein;

a resiliently deformable first arm extending from and electrically conductive with the first end of the side portion, the first arm having a central portion adjacent to the side portion and an end portion opposite from the side portion, the end portion defining a wire-receiving hole therein, the hole having a greater cross-sectional area than the wire-receiving holes in the body side portion;

a resiliently deformable second arm extending from and electrically conductive with the second end of the side portion and opposing the first arm, the second arm having a central portion adjacent to the side portion and an end portion opposite from the side portion, the end portion defining a wire-receiving hole therein, the hole having a greater cross-sectional area than the wire-receiving holes in the body side portion; and a battery terminal receiving cavity defined by and delimited between the central portions of the first and the second arms; wherein the body side portion, the first arm and the second arm are a single-piece unit integrally formed of an electrically-conductive material.

In a second aspect, the central portion of each arm defines a transverse through hole wherein the transverse through holes are in axial alignment one with the other.

In a further aspect, each wire-receiving hole defined in the side portion is arranged on a terminal side surface of the side portion. The terminal side surface is positioned opposite from the battery terminal receiving cavity.

In yet another aspect, the side portion of the battery terminal adapter defines a fastener bore corresponding to each wire-receiving hole. Each fastener bore is oriented perpendicular to a corresponding one of the wire-receiving holes and is in internal physical communication therewith.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1:
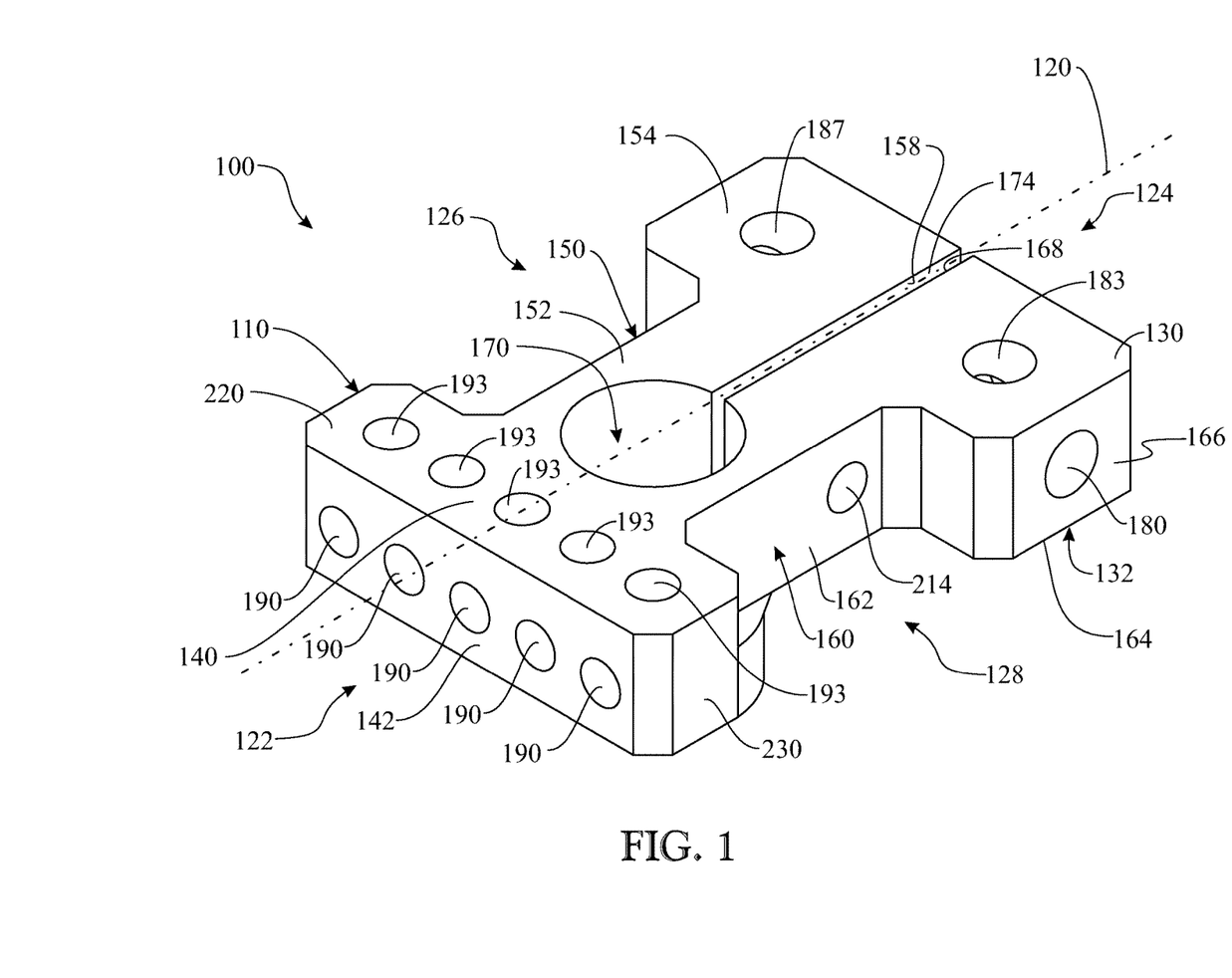
FIG. 1 presents an isometric view of a first exemplary embodiment of a battery terminal adapter in accordance with the invention.

The illustration of FIG. 1 shows an exemplary embodiment of a battery terminal adapter 100 in accordance with the invention. As will be explained, the battery terminal adapter 100 provides a conductive contact point that increases the number of electrical components that can connect to a power source battery. The battery may include, without limitation, a lead-acid battery, an SLI battery, and a photovoltaic cell battery. The battery terminal adapter 100 includes an adapter body 110 that attaches to a battery electrode or terminal, providing a framework for a plurality of conductive elements to electrically connect to the battery terminal. For this purpose, the body 110 includes strategically placed connection points and material compositions, as will be explained.

The adapter body 110 of the present embodiment is arranged generally along a longitudinal direction 120 and includes a longitudinal first end 122, an opposed longitudinal second end 124, a transverse first side 126 and an opposed transverse second side 128. In addition, the body 110 comprises a top surface 130 and a bottom surface 132. The body 110 further includes a side portion 140 from which two arms 150, 160 extend facing one another, generally along the longitudinal direction 120. Each arm 150, 160 comprises a central portion 152, 162 adjacent or contiguous to the side portion 140. In addition, each arm 150, 160 comprises an end portion 154, 164 arranged oppositely to the body side portion 140. A battery terminal receiving cavity 170 is delimited between the central portions 152, 162 of the arms 150, 160. The battery terminal receiving cavity 170 is shaped and sized to house a battery terminal or electrode, not shown in the figure. Arms 150, 160 are resiliently deformable in order for the size of the battery terminal receiving cavity 170 to be variable, so that the arms 150, 160 can fit tightly around a battery terminal that is inserted in the battery terminal receiving cavity 170. A longitudinal gap 174 extends from the battery terminal receiving cavity 170 and between the arms 150, 160.

In accordance with the invention, the adapter body 110 includes a plurality of wire-receiving holes for connecting multiple wires to a battery terminal that were inserted in the battery terminal receiving cavity 170. Specifically, the end portion of one or both arms comprises at least one wire-receiving hole in electrical communication with the battery terminal receiving cavity. For instance, in the present embodiment, the end portions 154, 164 of both arms 150, 160 comprise a respective wire-receiving hole 180, 184, said end portion wire-receiving holes 180, 184 being better shown in hidden (broken) lines in the top plan view of FIG. 2. In addition, the body 110 further comprises at least one wire-receiving hole arranged at the side portion 140. For instance, in the present embodiment, the body 110 comprises five wire-receiving holes 190. The battery terminal adapter 100 is configured so that all wire-receiving holes 180, 184, 190 are in electrical communication with the battery terminal receiving cavity 170.

Figure 2:
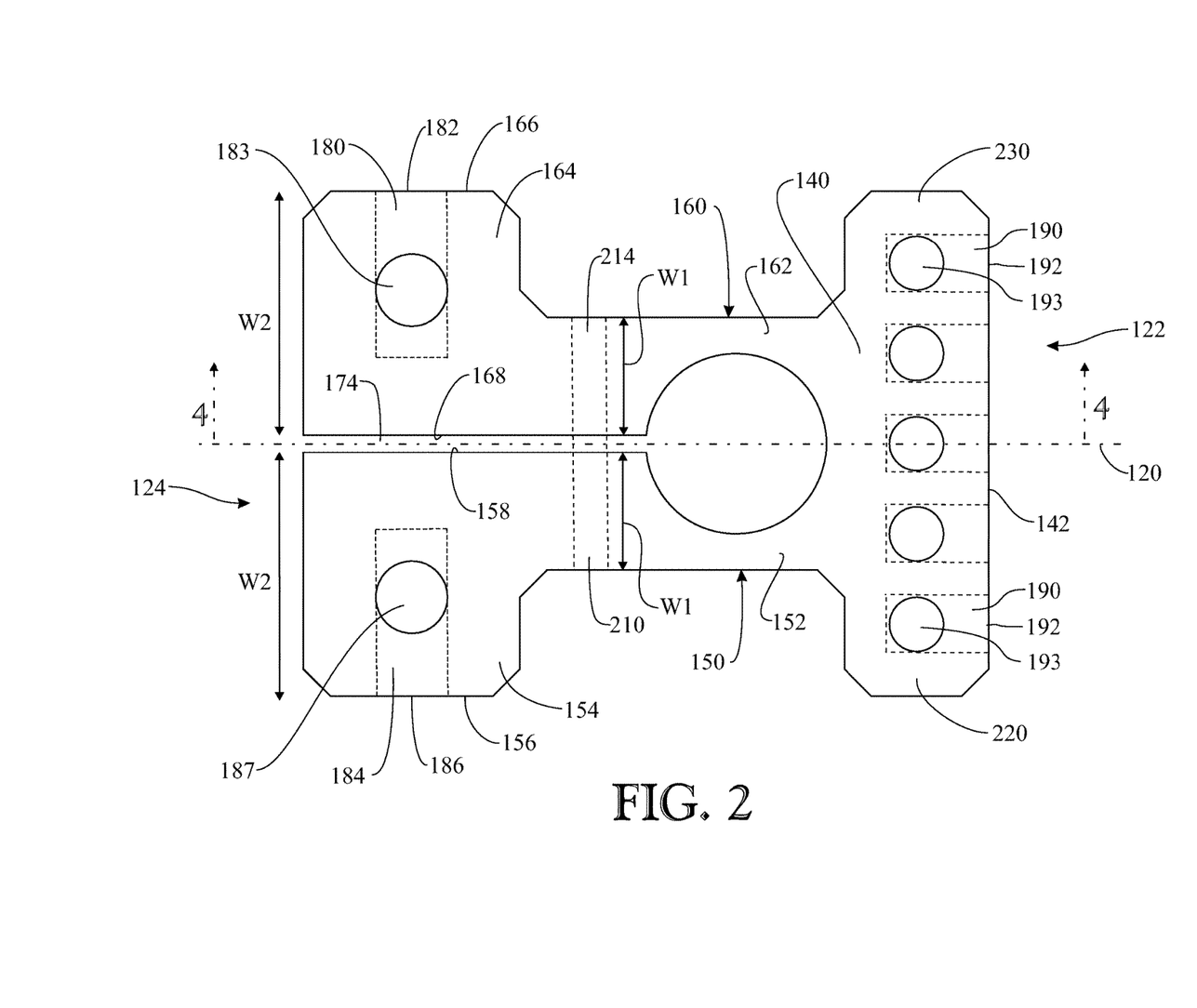
FIG. 2 presents a top plan view of the battery terminal adapter of FIG. 1.
Figure 3:
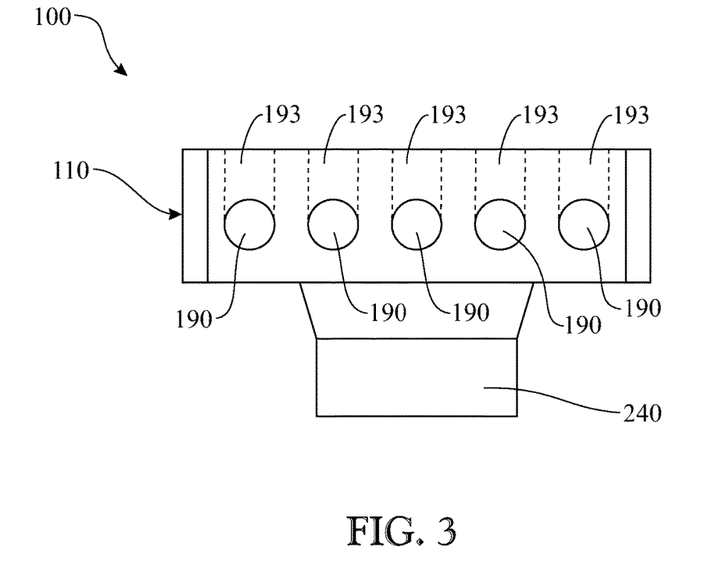
FIG. 3 presents a left side elevation view of the battery terminal adapter of FIG. 1.

In the present embodiment, the end portion 154, 164 of each arm 150, 160 is wider than the central portion 152, 162 of the arm, the arms 150, 160 thus being substantially L-shaped. The illustration of FIG. 2 shows the central portion width W1 being smaller than the end portion width W2. Having widened arm end portions 154, 164 provides greater volumetric dimensions for receiving higher cross-section wires. In other words, having the battery terminal adapter 100 provided with widened arm end portions 154, 164 allows the end portions 154, 164 to include wider wire-receiving holes 180, 184 and thus to receiver thicker electrical wiring.

As better shown in FIG. 2, the wire-receiving holes 180, 184 comprised in the arm end portions 154, 164 are arranged transversely, i.e., perpendicular to the longitudinal direction 120. The wire-receiving holes 180, 184 terminate in respective openings 182, 186 arranged on oppositely-facing respective side surfaces 156, 166 of the arm end portions. Having the openings 182, 186 arranged on oppositely-facing side surfaces 156, 166 prevents contact and possible tangling of the wires inserted through each respective opening 182, 186.

The adapter body 110 of the present embodiment includes an additional feature that allows to tightly and securely fasten the battery terminal adapter 100 onto a battery terminal. This additional feature consists in having the arm central portions 152, 162 comprise respective transverse through holes 210, 214, placed in alignment so that a fastener (not shown) can be inserted through both transverse through holes 210, 214. The fastener can be, for instance, a screw and a nut, or any other applicable fastener that allows exerting an inward force on the arms 150, 160 so they are resiliently deformed and brought together creating a tension, so that the arms 150, 160 tighten their grip of a battery terminal that is inserted in the battery terminal receiving cavity 170.

In the present embodiment, the side portion wire-receiving holes 190 are arranged on a terminal side surface 142 of the side portion 140, said terminal side surface 142 being arranged opposite to the battery terminal receiving cavity 170. The wire-receiving holes 190 end in respective openings 192 in the terminal side surface 142, while the wire-receiving holes 190 extend into the body 110 in the longitudinal direction 120. Having the openings 192 arranged on the terminal side surface 142 allows maximizing the separation between the wire-receiving holes 190 and the wire-receiving holes 180, 184 on the opposite end of the body 110, thus reducing the risk of wires tangling or short-circuiting in the vent of operating on the wires.

Preferably, as shown in FIGS. 1 and 2, the battery terminal adapter 100 further includes a fastener bore 183, 187, 193 corresponding to each wire-receiving hole 180, 184, 190. The fastener bores 183, 187, 193 are arranged perpendicular to the corresponding wire-receiving holes 180, 184, 190 and are physically communicated with the wire-receiving hole so that a fastener inserted into a fastener bore, such as a screw, can contact and exert a pressure on a wire in turn inserted in the corresponding wire-receiving hole. Such an arrangement allows securing wires inside the wire-receiving holes.

The wire-receiving holes 180, 184, 190 of the present embodiment are cylindrical bores. Alternative shapes are contemplated, such as the wire-receiving holes 180, 184, 190 having a D-shaped cross section, i.e., the holes having internal cylindrical walls truncated by a flat longitudinal wall. The flat longitudinal wall will generally face the fastener bores 183, 187, 193 to allow for the fasteners inserted in the fastener bores 183, 187, 193 to set flat on the electrical wires that are inserted in the wire-receiving holes 180, 184, 190, an thus enhance gripping of the wire by the fasteners.

In order to maximize the number of wire-receiving holes, the side portion 140 of the preferably comprises opposite transversely protruding end portions 220, 230, providing additional volumetric space for placing additional wire-receiving holes. For instance, in the present embodiment, protruding end portion 220 and protruding end portion 230 comprise one respective wire-receiving hole 190.

As has been mentioned, all wire-receiving holes are electrically communicated with the battery terminal receiving cavity 170, so that electrical current can flow between the battery terminal receiving cavity 170 and each wire-receiving hole. Various embodiments are contemplated for providing electrical communication. For example, the battery terminal adapter 100 can be entirely metallic and electrically conductive. In another example, the battery terminal adapter 100 is only partially metallic, so that metallic parts provide a conductive connection between the battery terminal receiving cavity and all wire-receiving holes; the rest of the battery terminal adapter 100 can be made, for instance, of plastic so that the battery terminal adapter 100 outer surface is electrically isolated and there is no risk of electric discharge for a person touching the battery terminal adapter 100 when connected to a charged battery. Applicable metallic materials include, without limitation, a creep resistant copper alloy, bronze, brass, or copper-nickel.

Figure 4:
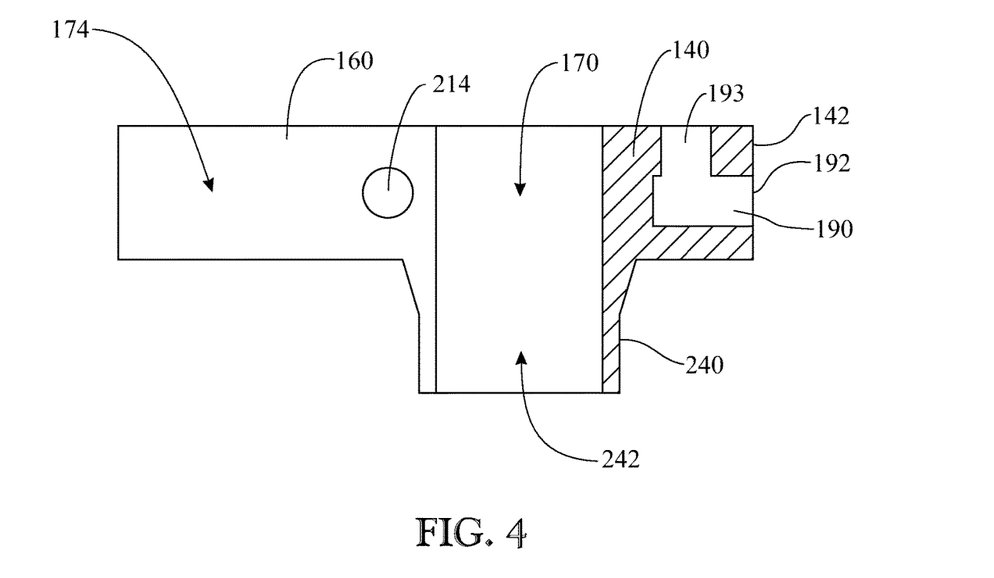
FIG. 4 presents a cross-sectional side elevation view of the battery terminal adapter of FIG. 1, according to cross-sectional plane 4-4 indicated in FIG. 2.

The adapter body 110 can optionally include a protruding neck portion 240. This protruding neck portion 240, as better shown in FIG. 4, provides an internal space 242 in continuation of the battery terminal receiving cavity 170, for incrementing the effective length of the battery terminal receiving cavity 170. Such an arrangement provides a mechanically robust connection to the battery terminal and further separation between the battery and the wires connected to the battery terminal adapter 100. The protruding neck portion 240 is a continuation of the side portion 140 and arms 150, 160, and is thus also resiliently deformable.

As has been explained, the end portion 154, 164 of each arm 150, 160 comprises a single wire-receiving hole 184, 180, and the body side portion 140 comprises one or more wire-receiving holes—in this embodiment, five wire-receiving holes—. Preferably, as shown, the wire-receiving holes 184, 180 arranged at the end portion 154, 164 of the arms 150, 160 have a greater cross-section than the wire-receiving hole or holes 190 comprised in the body side portion 140. Thus the wire-receiving holes 184, 180 can be used for connecting electrical cables capable of conducting higher electrical currents, for higher power consuming apparatus or systems such as a vehicle electrical system, whereas the opposite wire-receiving holes 190 can be used for connecting thinner cables for lower-power-consuming apparatus or systems, such as accessory electrical equipment installed in the vehicle (e.g., a fan).

Figure 5:
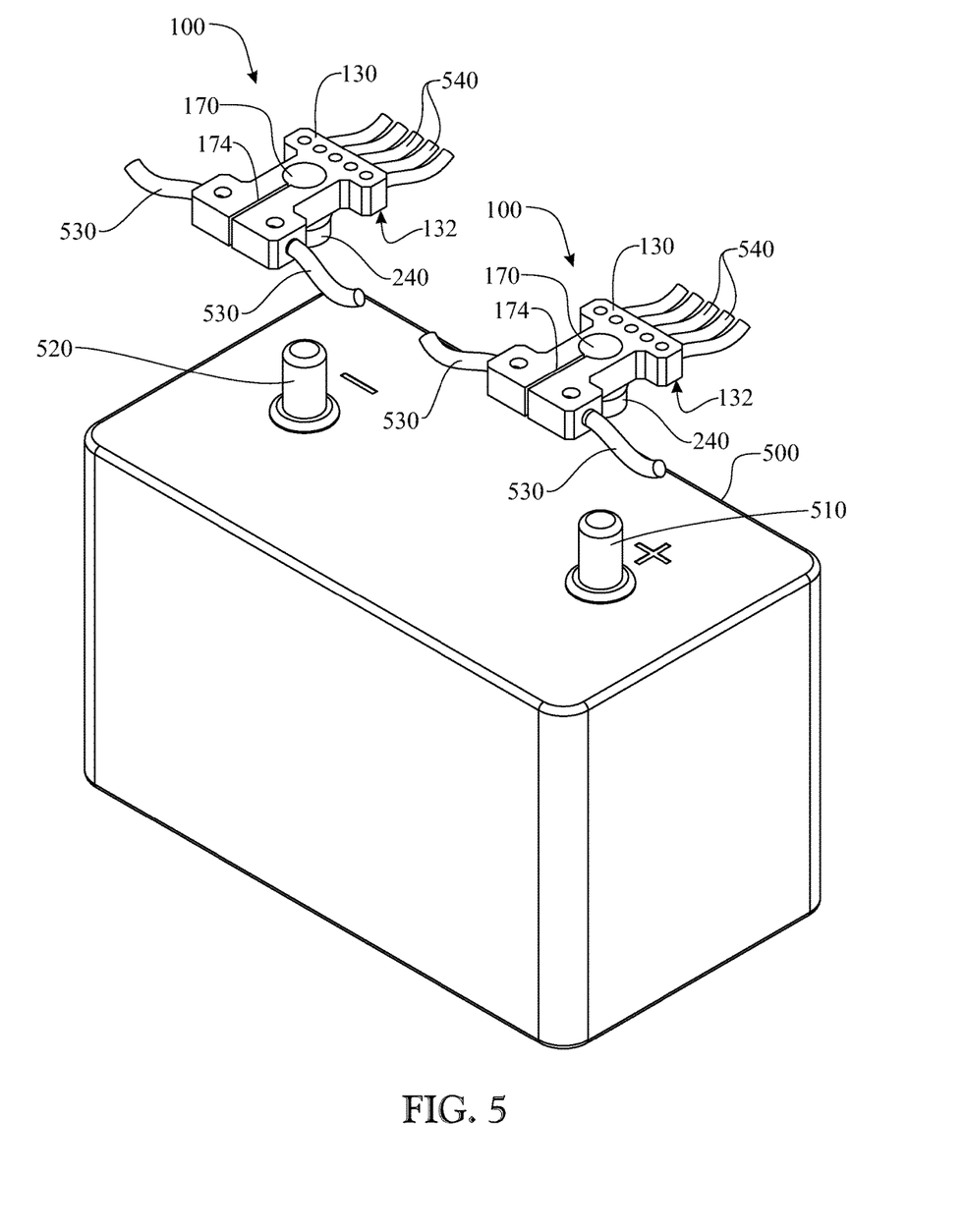
FIG. 5 presents an isometric front view of two battery terminal adapters of the type presented in FIG. 1, into which with a pair of primary cables and a plurality of secondary cables have been inserted, the battery terminal adapters shown about to be assembled onto two respective battery terminals of an exemplary vehicle battery.
Figure 6:
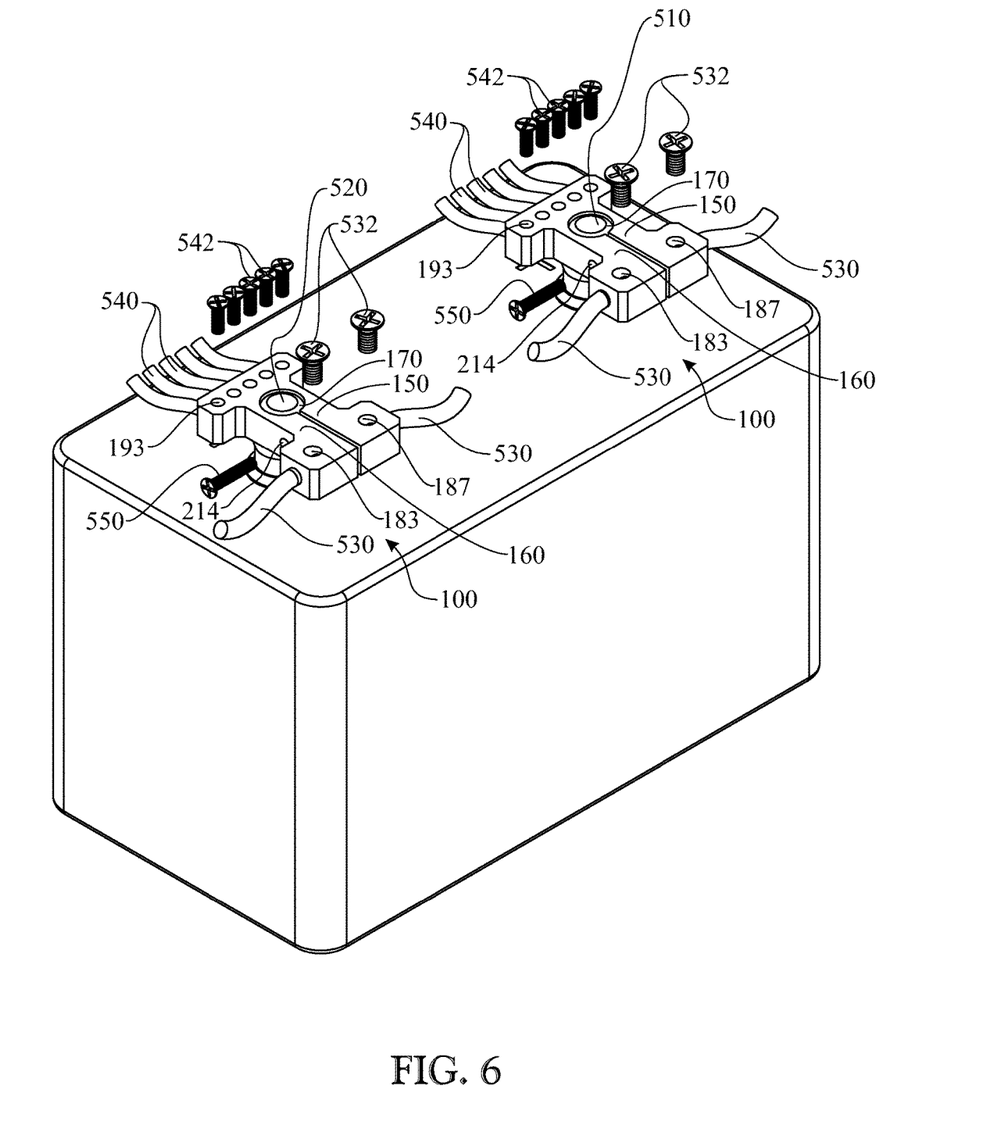
FIG. 6 presents an isometric front view of the battery terminal adapters of FIG. 5 partially assembled to the battery terminals.
Figure 7:
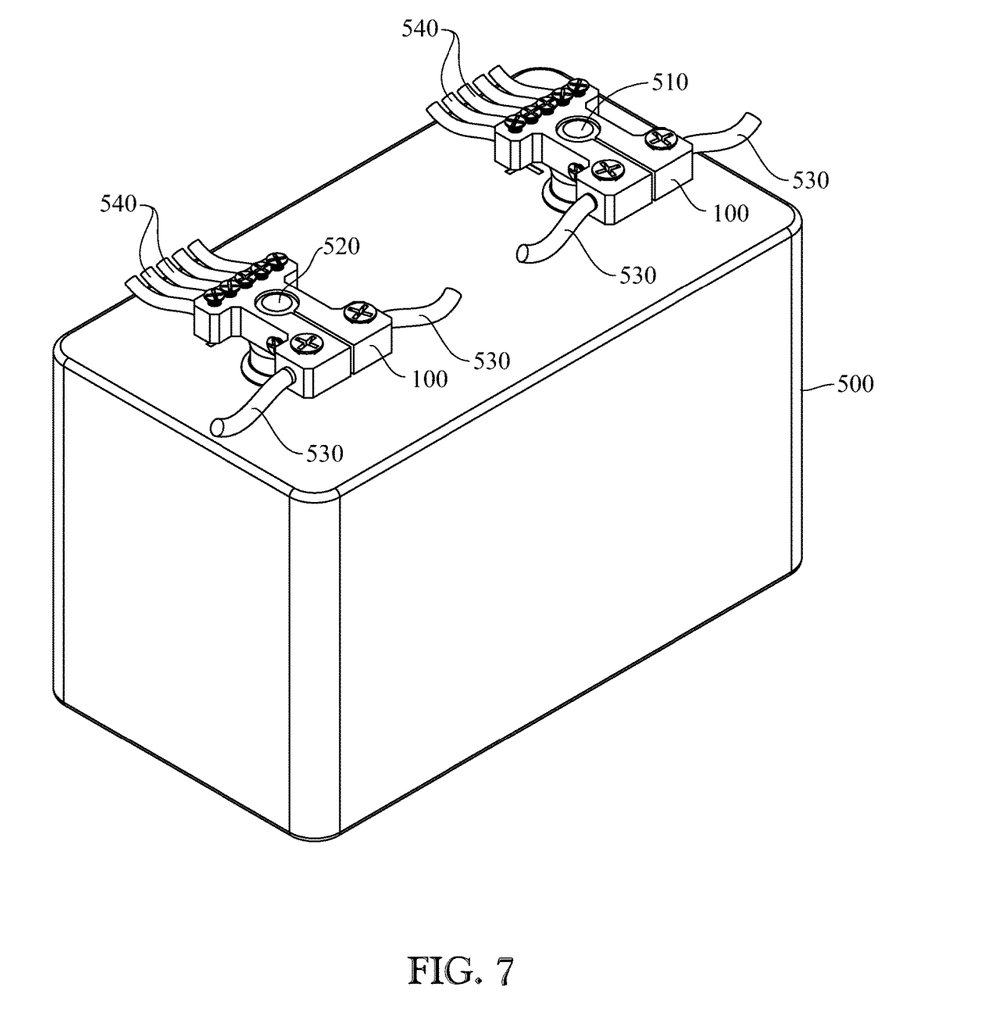
FIG. 7 presents an isometric front view of the battery terminal adapters of FIG. 5 fully assembled to the battery terminals.

The illustrations of FIGS. 5 through 7 teach an exemplary sequence of steps for assembling the battery terminal adapter 100 to an exemplary vehicle battery 500 provided with a positive terminal 510 and a negative terminal 520. More specifically, the figures show the steps to be followed for mounting one battery terminal adapter 100 to each battery terminal 510, 520. As shown in FIG. 5, thicker primary cables 530 and thinner secondary cables 540 have been inserted into the wire-receiving holes of each battery terminal adapter 100. The battery terminal adapters 100 have then been placed over the battery terminals 510, 520, so that the body bottom surfaces 132 and the protruding neck portions 240 face the battery 500, and so that the battery terminal receiving cavities 170 are aligned with the battery terminals 510, 520. Then, as depicted in FIG. 6, the battery terminal adapters 100 assembled onto the battery terminals 510, 520 so that the battery terminals 510, 520 are inserted and rest inside the battery terminal receiving cavities 170. Primary fasteners 532 and secondary fasteners 542 are inserted into the corresponding fastener bores 183, 187, 193, to secure the primary and secondary cables 530, 540 to the battery terminal adapters 100. In addition, transverse fasteners 550 are threaded into the transverse through holes 210, 214 to cause the arms 150, 160 to come together and tighten their grip around the battery terminals 510, 520. The final assembled state is illustrated in FIG. 7. As shown, the primary and secondary cables 530, 540 protrude outwardly from opposite ends of the battery terminal adapters 100, preventing undesired tangling of cables 530, 540 and maintaining cleanliness of the setup. In addition, separation of primary cables 530 from secondary cables 540 allows operation and manipulation of either type of cable without affecting the other, simplifying vehicle maintenance and repair, and installation and removal of electrical systems.

As shown in the figures, the battery terminal receiving cavity 170 of the present embodiment is cylindrical, and the longitudinal gap 174 is a narrow slot delimited by opposed parallel internal surfaces 158, 168 of the arms 150, 160. However, alternative embodiments are contemplated in which the shape of the battery terminal receiving cavity 170 and/or the longitudinal gap 174 may vary. For instance, alternative embodiments are contemplated in which the internal surfaces 158, 168 are arranged in a V-configuration, so that the end of the longitudinal gap 174 farthest to the battery terminal receiving cavity 170 is wider than the opposite end of the longitudinal gap 174. Such an arrangement enhances the ability of battery terminal adapter 100 to accommodate different size variations of battery terminals while maintaining the strength of the connection when tightening the battery terminal adapter 100 to the battery terminal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application, and all equivalents of those claims as issued.

What is claimed is:

1. A battery terminal adapter for allowing a plurality of electrical wires to be connected to a single battery terminal, said battery terminal adapter comprising:
   a body side portion having a first end and a second end, said body side portion defining at least one wire-receiving hole therein;
   a resiliently deformable first arm extending from said first end of said side portion, said first arm having a central portion and extending longitudinally from said side portion and an end portion opposite from said side portion;
   a resiliently deformable second arm extending from said second end of said side portion opposing said first arm, said second arm having a central portion and extending longitudinally from said side portion and an end portion opposite from said side portion; and
   a battery terminal receiving cavity defined by and delimited between said central portions of said first and said second arms; wherein
   at least one of the end portion of the first arm and the end portion of the second arm extends from and forms an L-shaped arrangement with the corresponding central portion of the first arm and the central portion of the second arm, respectively, and defines at least one transversely-oriented wire-receiving hole and at least one respective fastener bore corresponding to each transversely-oriented wire-receiving hole of the at least one transversely-oriented wire-receiving hole, wherein the respective fastener bore is configured to allow insertion of a fastener therethrough to secure a wire within the corresponding transversely-oriented fastener bore; and further wherein
   the battery terminal receiving cavity is electrically conductive with the at least one wire-receiving hole in the body side portion and with the at least one transversely-oriented wire-receiving hole.

2. The battery terminal adapter according to claim 1, wherein said transversely-oriented wire-receiving hole terminates at an opening arranged on an oppositely-facing respective side surface of said end portion.

3. The battery terminal adapter according to claim 1, wherein said central portion of each said arm defines a transverse through hole, said transverse through holes in axial alignment one with the other.

4. The battery terminal adapter according to claim 1, wherein each said wire-receiving hole defined in said side portion is arranged on a terminal side surface of said side portion, said terminal side surface being positioned opposite from said battery terminal receiving cavity.

5. The battery terminal adapter according to claim 4, wherein said side portion of said battery terminal adapter defines a fastener bore corresponding to each said wire-receiving hole, each said fastener bore being oriented perpendicular to a corresponding one of said wire-receiving holes and in internal physical communication therewith.

6. The battery terminal adapter according to claim 1, wherein said battery terminal adapter is formed of an electrically conductive metal.

7. The battery terminal adapter according to claim 1, wherein said battery terminal adapter is at least partially formed of a non-electrically conductive material and further wherein said battery terminal adapter includes a conductive connection between each said wire-receiving hole and said battery terminal receiving cavity.

8. The battery terminal adapter according to claim 1, further including a protruding neck in axial alignment with said battery terminal receiving cavity for incrementing an effective length of said battery terminal receiving cavity.

9. The battery terminal adapter according to claim 1, wherein said at least one of the end portion of the first arm and the end portion of the second arm defines a single transversely-oriented wire-receiving hole and said body side portion defines a plurality of wire-receiving holes and further wherein said single wire-receiving hole defined in said at least one of the end portions has a greater cross-sectional area than said wire-receiving holes defined by said body side portion.

10. The battery terminal adapter according to claim 1, wherein the fastener bore is oriented perpendicularly to the corresponding transversely-oriented wire-receiving hole and in internal physical communication therewith.

11. A battery terminal adapter for allowing a plurality of electrical wires to be connected to a single battery terminal, said battery terminal adapter comprising:
   a body side portion having a first end and a second end, said body side portion defining at least one wire-receiving hole therein;
   a resiliently deformable, L-shaped first arm extending from said first end of said side portion, said first arm having a central portion extending longitudinally from said side portion and an end portion arranged opposite from said side portion and extending from said central portion of the first arm;
   a resiliently deformable, L-shaped second arm extending from said second end of said side portion opposing said first arm, said second arm having a central portion extending longitudinally from said side portion and an end portion arranged opposite from said side portion and extending from said central portion of the second arm; and a battery terminal receiving cavity defined by and delimited between said central portions of said first and said second arms; wherein the end portions of said first arm and said second arm define a respective transversely-oriented wire-receiving hole therein and a respective fastener bore corresponding to the transversely-oriented wire-receiving hole and configured to allow insertion of a fastener therethrough to secure a wire within the corresponding transversely-oriented fastener bore, wherein the transversely-oriented wire-receiving holes of the end portions of the first and second arms terminate at respective openings arranged on oppositely-facing respective side surfaces of said end portions; and further wherein the battery terminal receiving cavity is electrically conductive with the at least one wire-receiving hole in the body side portion and with the respective transversely-oriented wire-receiving holes of the end portions of the first and second arms.

12. The battery terminal adapter according to claim 11, wherein said side portion of said battery terminal adapter defines a fastener bore corresponding to each said wire-receiving hole, each said fastener bore being oriented perpendicular to a corresponding one of said wire-receiving holes and in internal physical communication therewith.

13. The battery terminal adapter according to claim 11, wherein the fastener bore is oriented perpendicularly to the corresponding transversely-oriented wire-receiving hole and in internal physical communication therewith.

14. The battery terminal adapter according to claim 13, wherein said side portion of said battery terminal adapter defines a fastener bore corresponding to each said wire-receiving hole, each said fastener bore being oriented perpendicular to a corresponding one of said wire-receiving holes and in internal physical communication therewith, and further wherein the fastener bores of the side portion and the end portions are facing in a same direction relative to one another.

15. The battery terminal adapter according to claim 11, further including a protruding neck in axial alignment with said battery terminal receiving cavity for incrementing an effective length of said battery terminal receiving cavity.

16. A battery terminal adapter for allowing a plurality of electrical wires to be connected to a single battery terminal, said battery terminal adapter comprising:

a body side portion having a first end and a second end, said body side portion defining a plurality of wire-receiving holes therein;

a resiliently deformable, L-shaped first arm extending from said first end of said side portion, said first arm having a central portion extending longitudinally from said side portion and an end portion arranged opposite from said side portion and extending from said central portion of the first arm;

a resiliently deformable, L-shaped second arm extending from said second end of said side portion opposing said first arm, said second arm having a central portion extending longitudinally from said side portion and an end portion arranged opposite from said side portion and extending from said central portion of the second arm; and a battery terminal receiving cavity defined by and delimited between said central portions of said first and said second arms; wherein the end portions of said first arm and said second arm define a respective transversely-oriented wire-receiving hole therein and a respective fastener bore corresponding to the transversely-oriented wire-receiving hole and configured to allow insertion of a fastener therethrough to secure a wire within the corresponding transversely-oriented fastener bore, wherein the transversely-oriented wire-receiving holes of the end portions of the first and second arms are transversely oriented and terminate at respective openings arranged on oppositely-facing respective side surfaces of said end portions and have a greater cross-sectional area than said wire-receiving holes comprised in said body side portion; and further wherein the battery terminal receiving cavity is electrically conductive with the at least one wire-receiving hole in the body side portion and with the respective transversely-oriented wire-receiving holes of the end portions of the first and second arms.

17. The battery terminal adapter according to claim 16, wherein the fastener bore is oriented perpendicularly to the corresponding wire-receiving hole and in internal physical communication therewith.

18. The battery terminal adapter according to claim 17, wherein said side portion of said battery terminal adapter defines a fastener bore corresponding to each said wire-receiving hole, each said fastener bore being oriented perpendicular to a corresponding one of said wire-receiving holes and in internal physical communication therewith, and further wherein the fastener bores of the side portion and the end portions are facing in a same direction relative to one another.

19. The battery terminal adapter according to claim 18, further including a protruding neck in axial alignment with said battery terminal receiving cavity for incrementing an effective length of said battery terminal receiving cavity, wherein the protruding neck protrudes from the battery terminal receiving cavity oppositely to the fastener bores of the side portion and the end portions.

* * * * *